July 28, 1942.  L. M. PERSONS  2,291,500
THERMOSTAT CONTROL
Filed May 11, 1936  2 Sheets-Sheet 1
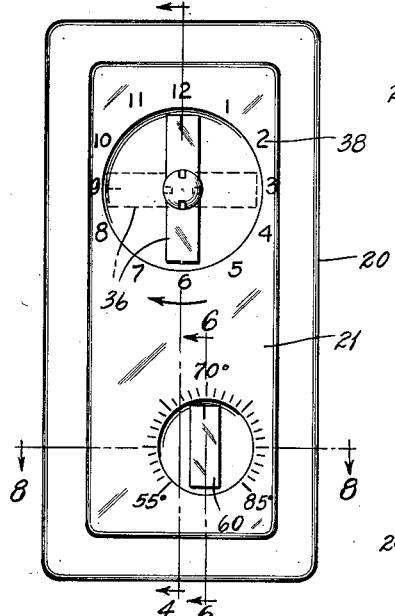
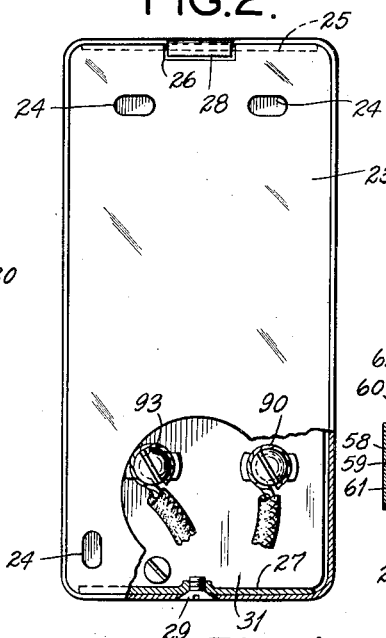
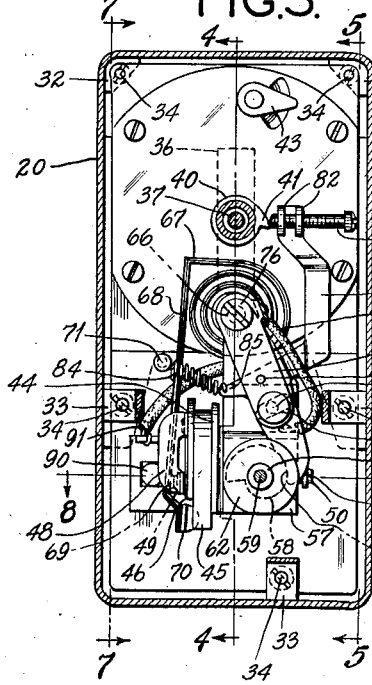
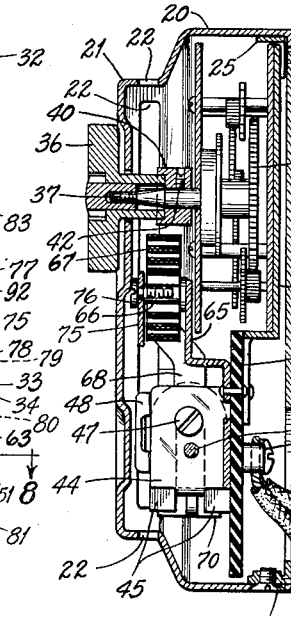
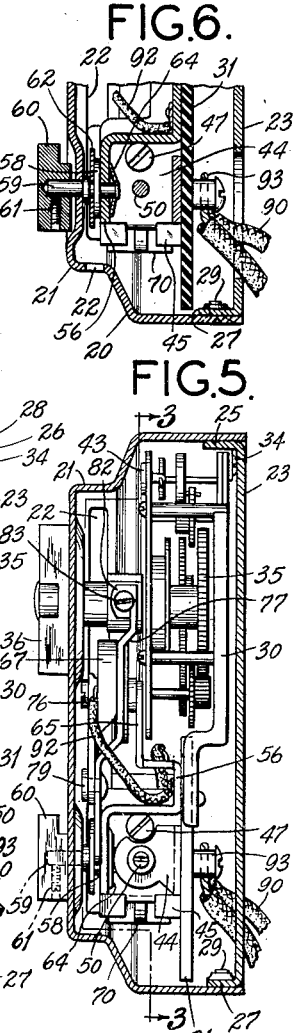
INVENTOR:
LAWRENCE M. PERSONS,
By Lawrence C. Kingsland
ATTORNEY.

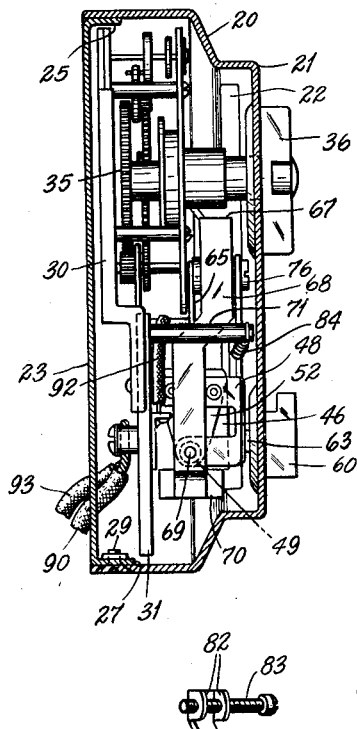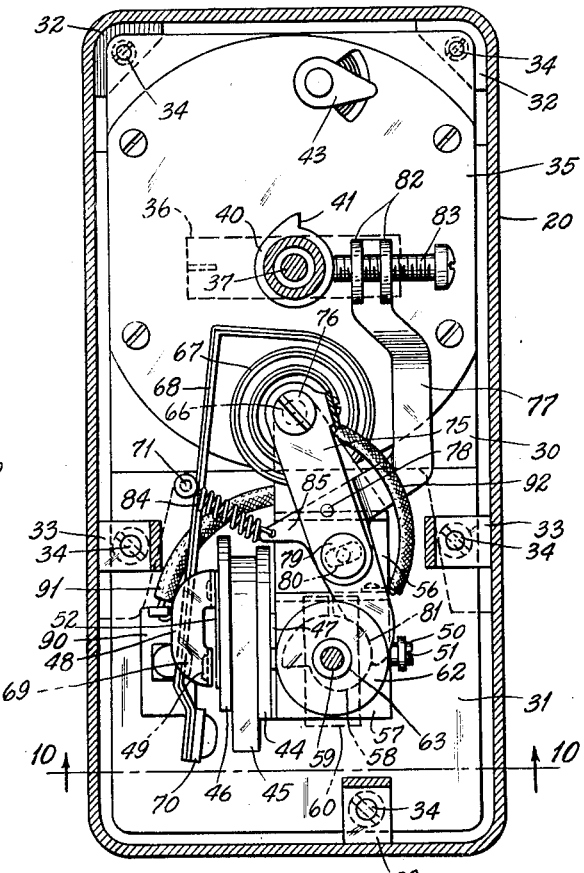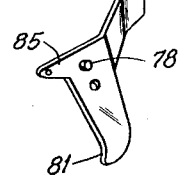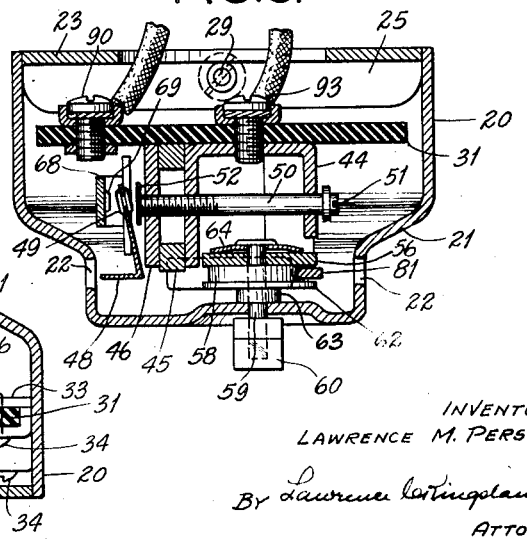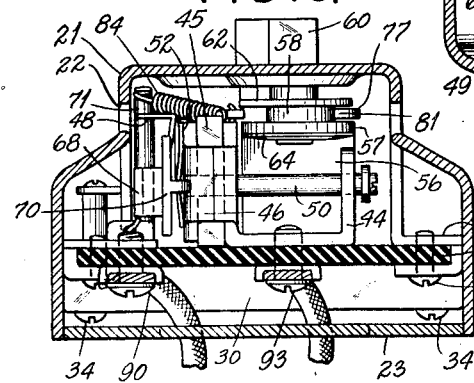

Patented July 28, 1942

2,291,500

UNITED STATES PATENT OFFICE 2,291,500

THERMOSTAT CONTROL

Lawrence M. Persons, St. Louis, Mo., assignor, by mesne assignments, to Automatic Control Corporation, St. Louis, Mo., a corporation of Delaware Application May 11, 1936, Serial No. 79,052

21 Claims. (Cl. 200—139)

The present invention relates to time and temperature control mechanism for machinery. In particular, it embodies a control operable in response to temperature changes, for opening or closing a cut-off such as an electric switch or the like. It includes a two-stage temperature setting mechanism operable from one stage to the other by a time device; and additionally includes an adjustable pre-set temperature adjustment.

Such controls are of general application, one illustration of which is their use as room thermostats for operating furnaces. In this use, the daytime room temperature may be predetermined and set by the instrument; and a lower nighttime room temperature obtained by a second setting.

Mechanisms of this type, such as those appertaining to furnace controls, have been devised to turn up the furnace at a predetermined hour of the morning, and to reduce the temperature of the room during the nighttime, the reduction generally being about 10 degrees. At a given hour of the morning, a clock control device, by suitable connections, resets the operating temperature to the daytime value. Heretofore, this has been done generally by the use of two separate thermostats, one operating at the desired night setting, and the other at the desired day setting. In such two-thermostat devices, the time mechanism at the preset hour abruptly changes the switch from under control of one to under control of the other. In case this is the change from the colder one to the hotter one, with the room at the cold temperature, the furnace is loaded suddenly to heat the room by the substantial amount of the differential between the two settings. When the air in the house reaches the desired daytime temperature, at which the room thermostat should turn the furnace off, the casing and the house wall upon which it is mounted, being poor heat conductors, are not up to the air temperature, as a consequence of which the thermostat remains closed despite the fact that the air in the room is as hot as desired. The thermostat will remain closed, causing the furnace to operate until these elements are heated; but in so doing, the air in the room is objectionably overheated. This overheating causes discomfort in the room and a waste of fuel. Several hours may be required to establish the desired temperature. It is an object of this invention to avoid this overheating.

More specifically, the present invention comprises means for turning the furnace on sometime in advance of the preset daytime heating hour and gradually increasing its output until this hour is reached, so that overheating is avoided. It is, therefore, a further object to turn the furnace on gradually, and slowly bring the room to the proper temperature.

It is a further object to attain the above objects by the use of a single thermostat, thereby increasing the simplicity of the control, and reducing its cost.

It is a further object to provide, in a control mechanism of this type, means for adjusting each of the two temperature settings, interoperated with time control mechanism for changing over from one setting to the other.

In one kind of time control mechanism, the operation, instead of being set for a given hour by an ordinary clock, is set for a predetermined number of hours. In other words, every night the time control may be adjusted at bedtime and set to turn the furnace on the desired number of hours thereafter. It is with this type of control that the present mechanism is generally to be associated in the ensuing description, since it has been found that this is a preferred type. However, as the description develops, it will be apparent that it may be attached to any type of time control.

In the drawings:

Fig. 1 is a front view of the device in its casing.

Fig. 2 is a rear view, partly broken away to show the connections.

Fig. 3 is a section on the line 3—3 of Fig. 5.

Fig. 4 is a section on the line 4—4 of Figs. 1 and 3.

Fig. 5 is a section on the line 5—5 of Fig. 3.

Fig. 6 is a section on the line 6—6 of Fig. 1.

Fig. 7 is a section on the line 7—7 of Fig. 3.

Fig. 8 is a section on the line 8—8 of Fig. 1.

Fig. 9 is a view similar to Fig. 3, but with the switch open.

Fig. 10 is a section on the line 10—10 of Fig. 9.

Fig. 11 is a perspective view of the control lever of the device.

The instrument is enclosed in a box-like casing 20. The casing includes an upstanding front portion 21 having air holes 22 through the sides thereof so that the surrounding air may circulate within the casing. A separable back wall 23 has suitable screw holes 24 therein by means of which it may be secured to a wall. The back wall is provided with a flange 25 extending from its upper edge, there being a cut-out portion 26 in the middle portion of this wall. The back wall 23 is likewise provided with a bottom flange 27. The main casing has a depending ear 28 engageable within the opening 26 to clamp against the flange 25. By this means the casing may be slipped over the top flange 25 with the ear 28 engageable in the cutout portion 26, and then fitted over the bottom flange 27. A removable screw 29 holds the casing 20 to the back wall so that the entire device is then supported from the said back wall 23, and secured by the single screw 29.

A two-part base panel or plate is provided, this panel comprising an upper section 30 and a lower section 31, the two sections being secured together. The upper section may be provided with a turned up flange along the lateral edges, if desired; and the lower section is made of nonconducting material. Flanges 32 in the upper corners of the casing and lugs 33 in the lower part of the casing are provided with threaded openings to receive screws 34, by means of which the base panel is firmly secured to the casing 20.

To the upper portion 30 of the base panel is secured timing mechanism generally indicated at 35. This need not be described in detail, it being sufficient to note that it comprises a combination winder and indicator 36 removably secured to a rotating shaft 37, the member 36 extending across the front of the casing and traversing a dial 38 thereon. There is also provided on the shaft 37 a cam 40 provided with a cam lobe 41. The cam 40 is secured to the shaft 37 by means of a lock screw 42.

In the operation of the clock mechanism, the handle 36 is turned from its initial or starting position, shown in full lines in Fig. 1, and in dotted lines in Fig. 3, to a point on the dial indicating the proper number of hours in advance of the time at which it is set, during which number of hours it will run in returning to the starting point. In other words, if it is desired to operate the clock mechanism five hours, the pointer will be turned to "5" and, during the ensuing five hours, it will return itself to its starting position indicated in Fig. 1. It will be clear that the cam 40 travels directly with the indicating handle 36. The clock is shown to be spring-operated with suitable escapement mechanism and with a hair spring adjuster shown at 43, though manifestly electrical or other timing mechanism could be used.

Within the casing and secured to the lower portion 31 of the base plate is an electric switch mechanism. This mechanism includes a switch bracket 44, generally U-shaped, as shown in Figs. 8 and 10. To one leg of the switch bracket 44 is fastened a permanent magnet 45 designed to produce snap-action in the operation of the switch. The magnet 45 is clamped to the switch bracket 44 by a switch contact supporting plate 46, the magnet being held between the plate 46 and the bracket 44 by a screw 47 (Figs. 4–6). Secured to the switch contact supporting plate 46 is a contact plate 48 of the kind described in my co-pending application Serial No. 80,090, filed May 16, 1936. In general, it comprises a flat U-shaped piece of resilient material, one of the legs of which is firmly secured to the supporting plate 46 and the other leg of which is free and carries the contact 49. The cross element joining the legs is turned substantially at right angles to the plane of the legs. Such a switch plate insures wiping action and sets up internal forces to break welds between the switch poles. In breaking contact, if a weld exists, the contact 49 is drawn on its leg upwardly, causing pivotal action about the bend joining this leg to the cross-element. The axis of this movement is at right angles to the axis of movement of the main switch blade to be desired. Beneath the contact 49 is an adjustable abutment, in the form of an adjusting screw 50 that passes through opposite legs of the U-shaped switch bracket 44 and has a kerf 51 in the free end thereof adapted to receive a screw driver for adjusting purposes. A flexible sheet 52 is mounted beneath the switch plate 48. This sheet is attached at one end, which end, for convenience, is made wider, to the plate 46 by means of the same securing elements that fasten the switch plate 48 thereto. By this means, the amount of lost motion in the switch plate 48 may be adjusted for purposes to be described.

A cam bracket 56 is secured to the lower base plate 31. The shape of this cam bracket is that of a modified U with flanges extending at right angles to each of the legs thereof. Upon one of these flanges 57 a cam 58 is pivoted by means of a shaft 59 extending through the front of the casing, and to which an adjusting handle 60 is attached by means of a set screw 61. The handle may be rotated on the shaft by loosening the set screw and made to correspond to the proper temperature reading. The cam is supported between a disc 62 and the flange 57. The disc 62 abuts a shoulder 63 on the shaft 59. The shaft extends through the bracket 56 and over it is placed a spring disc 64 held thereon by peening over the end of the shaft, as shown.

The other flange 65 of the bracket 56 has a pin 66 attached thereto. A coiled bimetal thermal element 67 surrounds the pin 66. A switch blade 68 forms an extension to the outer convolution of the thermal element 67. Thus, as the bimetal, in response to heat changes, contracts, it will draw the switch blade 68 toward the switch plate 48. The switch blade 68 is provided with a contact 69 adapted to meet the contact 49 on the switch plate 48. The switch blade is likewise provided with a T-shaped armature member 70 adapted to extend between the legs of the magnet 45 so that, as soon as it comes within the magnetic field thereof, it will be drawn quickly down, urging the switch contacts together. A post 71, upstanding from the base plate 31, acts as a stop limiting the outward movement of the switch blade 68.

The inner end of the coil 67 is secured to a lever 75. This coil lever is mounted for oscillation on the pin 66, it being secured thereto by a shouldered screw 76. Hence, when this lever is rotated in one direction or the other, it shifts the inner end of the thermal coil 67 to vary the amount of heat change required to close the contact 69 against the contact 49.

A control lever 77, shown in Fig. 11, is provided with an upstanding pivot lug 78 engaging in a suitable opening in the lever 75. The control lever 77 is also provided with a headed pin 79 engageable through an arcuate slot 80 in the lever 75. The pin 79 holds the two levers together and keeps the pivot lug 78 engaged with its opening in the lever 75. One end of the control lever 77 is provided with a cam face 81 adapted to engage against the cam 58 and be moved thereby. The other end of the control lever 77 is provided with spaced ears 82, supporting for adjustment therethrough a cam screw 83 that is adapted to be operated by the lobe 41 on the cam 40.

The control lever 77 is maintained against the two cams by a coil spring 84 attached between it and the post 71, there being an ear 85 on the control lever 77 to receive one end of the said spring.

A terminal member 90 is secured to the base plate 31. From this terminal member extends an electrical connection 91 leading to the bracket 56. A lead 92 extends from the bracket 56 to the bimetal 67 and thence to the switch blade 68. A second terminal 93 is secured in electrical contact with the switch bracket 44. The cam bracket 56 is out of electrical contact with the switch bracket 44.

The operation of the device is as follows:

The leads from the furnace motor are brought respectively to the terminals 90 and 93. Of course, it will be understood that it is immaterial what sort of mechanism is being controlled. It may be a furnace motor or a relay or anything of this kind. It will be assumed that, at first, the contacts 49 and 69 are separated so that the circuit is open, as is shown in Fig. 9. The handle 60 is turned to the desired room temperature. Rotation of this handle by corresponding rotation of the shaft 59 turns the cam 58. When it is desired to increase the temperature, the handle 60 and shaft 59 are rotated clockwise, as shown in Figs. 1, 3 and 9. The control lever 77 may be considered as pivoted about the contact of the screw 83 with the cam 40, it being assumed at this time that the cam 40 is not moving. Hence, rotation of the pre-set cam 58 clockwise shifts the cam follower 81 on the control lever 77 to the right in the figures mentioned. By means of the connection 78 between the control lever 77 and the coil lever 75, the latter coil lever is rotated counterclockwise about its pin 66. Since the coil lever 75 is rigidly attached to the innermost convolution of the bimetal coil 67, the latter is rotated bodily counterclockwise. This carries with it the switch lever 68 and causes the contact 69 to approach the contact 49 so as to be initially closer thereto than formerly. The action of heat on the bimetal coil 67 tends to unwrap it, which unwrapping shifts the switch blade 68 to the left in the figures mentioned and draws the contact 69 away from the contact 49. However, in the new adjustment to increase heat, the coil must unwrap further than before in order to separate the contacts. Consequently, the switch will remain closed until the surrounding air becomes hotter than was required in the initial setting. Or vice versa, since the contact 69 is initially closer to the contact 49, less cooling is required to bring the said contact 69 to the contact 49, and the switch will close at a higher temperature than before.

Quite obviously, the converse is true. Rotating the handle 60, the shaft 59 and the pre-set cam 58 counterclockwise permits the cam follower 81 on the lever 77 to move to the left, it being drawn by the spring 84. Correspondingly, the coil lever 75 and the coil 67 are rotated clockwise and the contact 69 moved further away from the contact 49. Since cooling contracts the coil 67, considerably more cooling of the surrounding atmosphere must take place before the contacts 69 and 49 are closed. It will be understood that the spring 84 draws both the control lever 77 and the coil lever 75 to the left, as shown. It maintains the adjusting screw 83 in contact with the cam 40, and the cam follower 81 in contact with the cam 58 and acts upon the coil lever 75 by virtue of the connection 78 between the said coil lever and the control lever 77. Since, under this structure, the control lever 77 is not fixedly mounted upon the base or any other fixed element, the headed pin 79 operating within the slot 80 holds the control lever 77 onto the coil lever 75 and thus to the fixed pin 66.

From the above, it may be seen that the desired room temperature may be set by operation of the indicator handle 60. It will now be shown how the time mechanism also controls the switch.

As previously set forth, the cam 40 is controlled by clockwork mechanism. Before setting, the indicator 36 will be in a starting position such as is shown in full lines in Fig. 1. The relative position of the cam lobe 41 at this setting is shown in Fig. 3, wherein it will be seen that the aforesaid cam lobe has acted to shift the adjusting screw outwardly. In this position, the contacts 69 and 49 may or may not be together, according to the room temperature and its action upon the coil 67. It will be remembered that, to reduce the pre-set temperature by the handle 60, the coil lever 75 was shifted clockwise. When it is desired to have the furnace operate at a reduced temperature for a certain number of hours, the handle 36 is rotated clockwise until its pointer end reaches the figure representing the number of hours on the dial 38. As shown in dotted lines in Fig. 1, it has been advanced nine hours. This may represent a condition where the operator desires to set the furnace back at 10:00 P. M. and have the house warm at 7:00 A. M. the next morning. Such setting for nine hours in advance is shown in Fig. 9. It will be understood that the clockwork mechanism 35 will rotate the shaft 37 back counterclockwise so that, in nine hours, it will return to the position shown in full lines in Fig. 1.

In advancing the handle 36 to the position of Fig. 9, the cam lobe 41, which, in the starting position shown in Fig. 3, was under the adjusting screw 83, is withdrawn from the adjusting screw and the latter, under the action of the spring 84, is brought over against the body of the cam 40. In this action, the control lever 77 may be considered as pivoting about the contact between the pre-set cam 58 and its follower 81. Consequently, the connection 78 between the control lever 77 and the coil lever 75 is shifted to the left, in Fig. 9, from its position in Fig. 3. This causes the coil lever 75 to be rotated clockwise and the coil 67 to be correspondingly shifted clockwise. Wherefore, the switch blade 68 is shifted and the contact 69 moved further away from the contact 49. As a consequence of this, greater contraction of the coil 67 is necessary in order to bring the contact 69 to the contact 49 or, in other words, the switch will not close until the surrounding temperature is reduced to a greater extent than was required in the setting of Fig. 3.

This condition will remain thus until the cam lobe 41, under the action of the clockwork mechanism, is again brought under the screw 83 to return the same to the position of Fig. 3. It is to be observed that the cam lobe 41 is of considerable arcuate extent and slopes gradually up to its peak, the peak coming at the starting position. Relative to the dial, the length of the cam may be in the order of two hours. Therefore, it may be seen that, over a substantial period prior to the final return to the position of Fig. 3, the thermostat coil 67 is being brought gradually toward its position in Fig. 3. Stated differently, if the difference between the body of the cam 40 and the cam lobe 41 is 10 degrees, so that, during the night, the room is cooled down to a condition 10 degrees below the daytime setting, during the last two hours of the night before the furnace is turned on full, this temperature difference is gradually reduced. It may be assumed, for instance, that, at five o'clock, a night setting of 60 degrees holds and, at seven o'clock, the day setting of 70 degrees is to be fully reached. With this gradual cam, at an intermediate time such as six o'clock, the difference that formerly was 10 degrees between the night and day setting is reduced to say 5 degrees and the room temperature is brought up to 65 degrees. Finally, when seven o'clock comes, the room is warmed up to its daytime value.

By thus gradually raising the temperature over an extended period, the thermostat, the wall upon which it is mounted, and the air are brought to the desired temperature at approximately the same time. In heating a room by sudden application of the furnace, the air is heated rapidly. However, the walls are slow to heat, as is also the control casing. Further, since the casing is mounted against a wall, it frequently occurs that the circulation of air from the radiator sends hot air upwardly to the ceiling, displacing cold air that falls in a stream down the other walls. Such stream of cold air necessarily passes through the control casing. These facts, viz., the low temperature of the walls and casing, and the cold air currents, cause the thermostat to remain open despite the fact that the main body of air in the room is equal to the desired temperature, or exceeds it. As a consequence, the room is overheated until these adverse factors are overcome. In bringing the temperature up slowly, the said factors are eliminated, and the room is not overheated.

It will further be evident that, by means of this interoperated control wherein the time setting and the pretemperature setting operate on the same thermostat, or, in any event, operate through the same control mechanism, the time control always remains under the primary control of the pre-set indicating handle 60. Consequently, if, during the night, the surrounding temperature so increases that it reaches the daytime value, the coil 67 will be acted upon to prevent closing of the switch by the action of the cam lobe 41 upon the lever 77. Furthermore, the cam lobe establishes a differential of temperature so that, if during the night, it is desired to change the setting by the handle 60, the new values will be preserved in the operation of the clock mechanism.

The adjusting screw 83 gives an internal control over both settings. In other words, to adjust the action of the bimetal coil 67 to correspond to the thermometer reading, it is only necessary to adjust the screw 83 in or out. This does not affect the action of the time mechanism which is superposed over such adjustment. Turning the screw in, the control lever 77 is shifted outwardly at its upper end. Correspondingly, a new preliminary setting of the coil lever 75 and the coil 67 is obtained wherein the entire instrument is set to operate at a higher temperature.

Other adjustments are provided, such as the clock control adjustment 43 operating on the hair spring, if the clock is mechanical. The adjusting screw 50 controls the differential of the thermostat, by varying the amount the armature 70 may move into the field of the magnet 45. If the thermostat closes at 68 degrees by cooling of the bimetal coil, it will be held in its closed position both by the coil and by the added effect of the magnetic action. In other words, once the switch is closed, greater force is required to open it because of the resistance of the magnet. Consequently, the switch will not open at 68 degrees, but at a higher temperature, such as 70 degrees, the difference being called the thermostat differential. This avoids fluttering of the switch, and also insures operation of the furnace periodically to prevent its going out. The differential is adjusted by varying the distance the armature moves into the magnetic field, the strength of which varies exponentially with the distance from the poles. Turning the screw 50 in reduces this distance, and consequently varies the differential. This adjustment can, of course, be used on other snap-action mechanisms than the magnetic one shown.

It will, of course, be understood that the back plate 23 is fastened to the wall by screws extending through the openings 24. The entire instrument is mounted within the casing 20 and secured thereto by the screws 34. The instrument, in its casing, is then slipped onto the back plate and the screw 29 tightened to hold it thereto. A hole extends through the casing wall, as shown in dotted lines in Fig. 9, to give access to the adjusting screw 50 without taking the instrument down. If desired, a hole also may be provided through the casing for access to the adjusting screw 83.

It will be seen that a simple, compact instrument has been provided that gives, in itself, full control by time and temperature of a heating plant, or whatever else may be operated by it. It is, of course, understood that it has general application for anything that it is desired to operate by heat changes. It involves a minimum number of parts and very little space.

Although the device has been shown as operating an electric switch, it is understood that any device operable by movement may be used, such as a valve. Hence the term cut-off in the claims is intended to be generic to such other devices. Furthermore, instead of using a temperature responsive element 67, to provide a device operable in response to temperature changes, a pressure element could be used, or other elements responsive to such physical conditions, to provide pre-set and time-controlled mechanisms operable by such changes.

What is claimed is:

1. In a device of the kind described, a displaceable member movable in response to changes in physical conditions, a pre-set device to displace the member to select the value at which said member shall operate, a second device to additionally displace the member and alter the value at which said member shall operate by a predetermined amount, means connected to both said devices to receive the changes effected thereby and to integrate the same to superpose the changes produced by the second device onto those produced by the first, and means connecting said last-named means to said member to transmit the effects of said devices thereto.

2. In a device of the kind described, a member movable in response to changes in physical conditions, a pre-set device comprising a first movable element to select the value at which said member shall operate, time-controlled means to actuate said first movable element, a second device comprising a second movable element to additionally alter the value at which said member shall operate, a moved element adapted to receive the movement of both said devices, collectively or separately, and means connecting said moved element to said member to transmit the movements thereof to said member and impress them thereon whereby said member operates at the value determined by them.

3. In a device of the kind described, a member movable in response to changes in physical conditions, a pre-set device comprising a cam rotatable to select the desired value at which said member shall operate, a second device comprising a second cam rotatable by time mechanism to additionally alter the value at which said member shall operate, a control lever having elements engageable with both said cams whereby to be shifted by either or both of them, and means connecting said control lever to said member to transmit the movements thereof to the member and cause said member to operate at the value thus determined.

4. In a device of the kind described, a base, a member movable in response to changes in physical conditions, means oscillatively mounting the member on the base including a lever, a second lever pivotally connected to the first lever and extending in two directions from the pivotal connection, and a movable means acting upon each end of said second lever to shift the same, whereby action of either movable means upon the second lever will cause it to shift the first lever, and said first lever will thereby oscillate the member on the base in response to either or both movable means.

5. In a device of the kind described, a base, a coiled thermal member, a first lever pivoted to the base and connected to an inner convolution of the coiled member so that movement of the lever about its pivot will bodily rotate the said member, a second lever pivoted intermediate its ends to said first lever, a pre-settable device acting to shift one end of the second lever, and a second device operable in response to time changes to shift the other end of said second lever, so that movement of either device causes the coiled member to be shifted bodily, and a cut-off element associated with said coiled member to be shifted by movement thereof.

6. In a device of the kind described, a mechanism including a cut-off device and means adapted to operate said cut-off device in response to physical changes, and means for altering said mechanism to cause the same to operate at a reduced value and to reoperate at a higher value after a predetermined time, said means including a time-operated cam rotated one revolution during a predetermined period of time, and a lever shifted by said cam, the cam having a surface gradually increasing in the direction of motion of the lever whereby to shift the lever slowly and over a substantial period of time, and thereby progressively to raise the value at which said mechanism operates from said lower value until it reaches the higher value.

7. A mechanism as in claim 6, together with adjustable means establishing contact between the cam and the lever.

8. A cut-off switch adapted for use in operating furnaces in response to temperature changes in the place heated, including a relatively fixed contact, a blade having a contact thereon, a thermal element adapted to move said blade and to close said switch in response to temperature changes, and means for reducing the temperature at which said thermal element will operate to close the switch, and means for continuously and gradually increasing the temperature of operation from its reduced value in an unbroken line change until it reaches its normal value, whereby to cause said furnace gradually to heat the place aforesaid.

9. In a device of the kind described, a cut-off operated in response to temperature changes, means for predetermining the temperature at which said cut-off will be operated, and time-controlled means and means operated by the same for gradually increasing said temperature of operation, said last-named means including a displaced element and an element designed to displace the same increasingly and steadily in an unbroken line change from said first-named value to a higher one.

10. In a device of the kind described, a switch operated in response to temperature changes, a casing for said switch, said casing having two dials thereon, time controlled mechanism within said casing for controlling the operation of said switch including means establishing a temperature of operation, and means increasing said temperature of operation gradually over a substantial period of time until it reaches a given higher temperature, means in said casing to pre-set one of said temperature values to cause operation of said switch at the said predetermined temperature value whenever the same is not changed by the time-controlled mechanism, and said time-controlled mechanism being adapted to superpose its changes on said predetermined value, and to cause the switch to return to operation at such predetermined value upon completion of the cycle of operation of said time-controlled mechanism, said time control mechanism having a combined indicator and setting means operating over one of said dials, and said pre-set means having an indicator operating over said other dial.

11. In a switch mechanism, a base comprising two sections, one of which is of non-conducting material, a switch mounted on said non-conducting portion, said switch having a relatively fixed contact, a relatively movable contact, a first bracket supporting the fixed contact, a second bracket supporting the movable contact and overhanging the first bracket, a thermal element mounted on said second bracket and adapted to operate said movable contact with pivotal action, adjusting means for said thermal element mounted on the overhanging portion of said second bracket, snap-action means on said first bracket and adapted to act upon said movable contact, said relatively fixed contact including a blade upon which the contact element is mounted, means supporting said blade for limited pivotal movement about an axis at an angle to the axis of movement of the movable contact, and electrical conductors connected to said respective brackets.

12. In a device of the kind described, a mechanism including a temperature-responsive movable member and a switch actuated thereby, a time-controlled means and a cam rotated thereby, an adjusting cam spaced from said time-controlled cam, a lever engageable with both cams, resilient means maintaining said lever in contact with both cams whereby it is moved by rotation of either or both, and means connecting said lever to said mechanism to adjust the temperature of operation thereof in response to changes of either cam.

13. In a device of the kind described, a member movable in response to changes in physical conditions, a cut-off operated thereby, a first cam, a second cam, time-controlled means to rotate one of said cams, a lever, means maintaining said lever in contact with both of said cams to receive the movements produced by each, and means connecting said lever to vary the value of physical conditions at which said cut-off is operated by said member.

14. In a device of the kind described, mechanism including a member movable in response to physical conditions, a cut-off operated thereby; a cam, time-controlled means to rotate said cam, a movable member, a lever fulcrumed both on said cam and said movable member to receive the movements of both, means to transmit the movements of said lever to said mechanism to vary the value at which said cut-off will be operated by said member, and said cam having a slope so related to its speed of rotation that the lever is moved by said cam slowly.

15. In a device of the kind described, a mechanism including a member movable in response to temperature changes and a switch operated thereby, time-controlled means interengaged with said mechanism to cause the same to operate at one temperature and thereafter to change to another temperature, said means including a cam rotated by the time mechanism and a lever shifted thereby, said cam being rotated relatively slowly and having a gradual slope against which said lever operates, whereby the change in temperature may be effected gradually.

16. In combination, a means to produce changes in physical conditions, and a device responsive to the changes produced for controlling said means; said control device including a mechanism having a member responsive to changes in such physical conditions and a cut-off operated thereby, time-controlled means to alter the value of the physical condition at which said cut-off is operated by said member, said time-controlled means including a displacing element and a displaced element, with the former being adapted to displace the latter steadily in an unbroken line change over such a period of time that the change-producing means moves from its first value to its altered value sufficiently slowly to prevent substantial overriding of its altered value.

17. In a device of the kind described, a mechanism including a member movable in response to changes in physical conditions and a switch operated thereby, time-controlled means having a cam thereon, pre-selection means to set the time-controlled means for operation for a desired period of time during which said cam is rotated, and to stop at the end of such time, the cam having a fall of a certain extent presented during the first part of its movement, and a rise at the latter part thereof and presented when said time-controlled means is inoperative, a lever maintained in contact with said cam, additional adjusting means for said lever, and means connecting said lever to said mechanism to adjust the temperature of operation thereof in response to movements of the lever by said time-controlled means and said adjusting means.

18. In a device of the kind described, a mechanism including a member movable in response to changes in physical conditions and a switch operated thereby, time-controlled means having a cam thereon, pre-selection means to set the time-controlled means for operation for a desired period of time during which said cam is rotated, and to stop at the end of such time, the cam having a fall of a certain extent presented during the first part of its movement, and a rise at the latter part thereof and presented when said time-controlled means is inoperative, a lever maintained in contact with said cam, additional adjusting means for said lever, and means connecting said lever to said mechanism to adjust the temperature of operation thereof in response to movements of the lever by said time-controlled means and said adjusting means, in which the slope of said cam from its lower fall to its rise is graduated to move said lever gradually over a substantial period of time.

19. In a device of the kind described, a mechanism having a temperature-responsive movable member and a switch actuated thereby, time-controlled means for changing the operation of said mechanism, additional means for adjusting the temperature at which said mechanism operates, means interrelating said time-controlled means and said additional means so that they operate cumulatively on said mechanism, means providing a temperature differential between opening and closing of said switch, and means for adjusting said differential.

20. In a temperature responsive instrument, a thermally-responsive actuating means, a cut-off member operated thereby, a first selectively adjustable means, a second movable means operable in response to time changes, and means to transmit adjustments from both said first and second means to said thermally-responsive means, said transmitting means being adapted for accumulating said adjustments so that the operation of the thermal means is determined by the setting of both of them.

21. In combination, means to produce changes in physical conditions, and a device responsive to changes produced for controlling said means, said control device including a mechanism having a member movable in response to such changes in physical conditions, and a cut-off toward and from which the member moves, time-controlled means to displace said member and cut-off relative to each other, said time-controlled means producing said displacement gradually in an unbroken line change over a period of time so that the first means, above, is caused to produce its changes gradually without substantial overriding.

LAWRENCE M. PERSONS.